Oct. 2, 1934.  J. E. JEWETT, ET AL  1,975,230
ROTARY DRUM FILTER
Filed Jan. 31, 1930    3 Sheets-Sheet 1
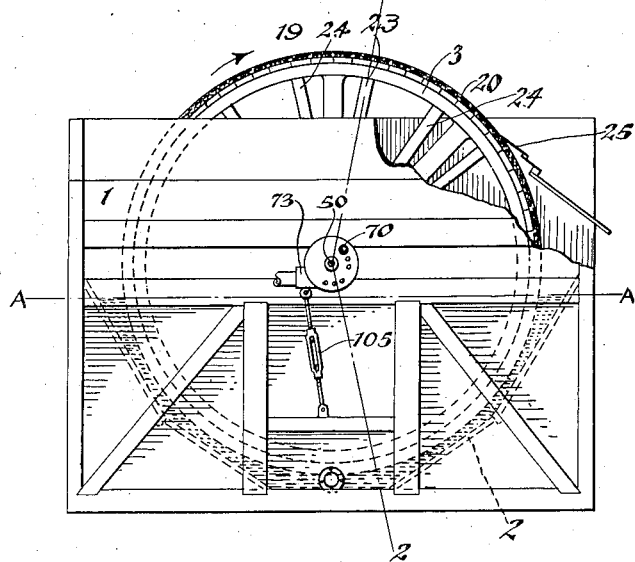
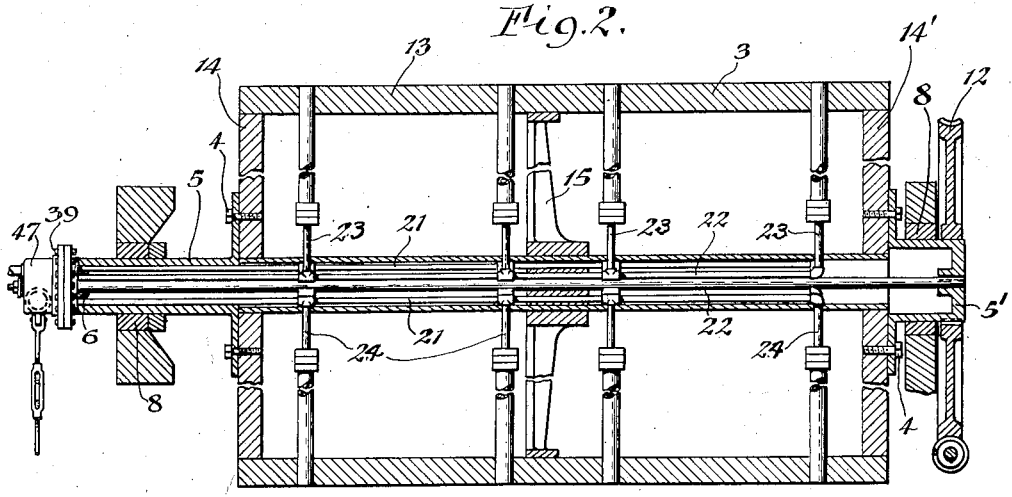
Inventors
JOSEPH E. JEWETT
CLARENCE G. KIPLINGER
by
Attorney

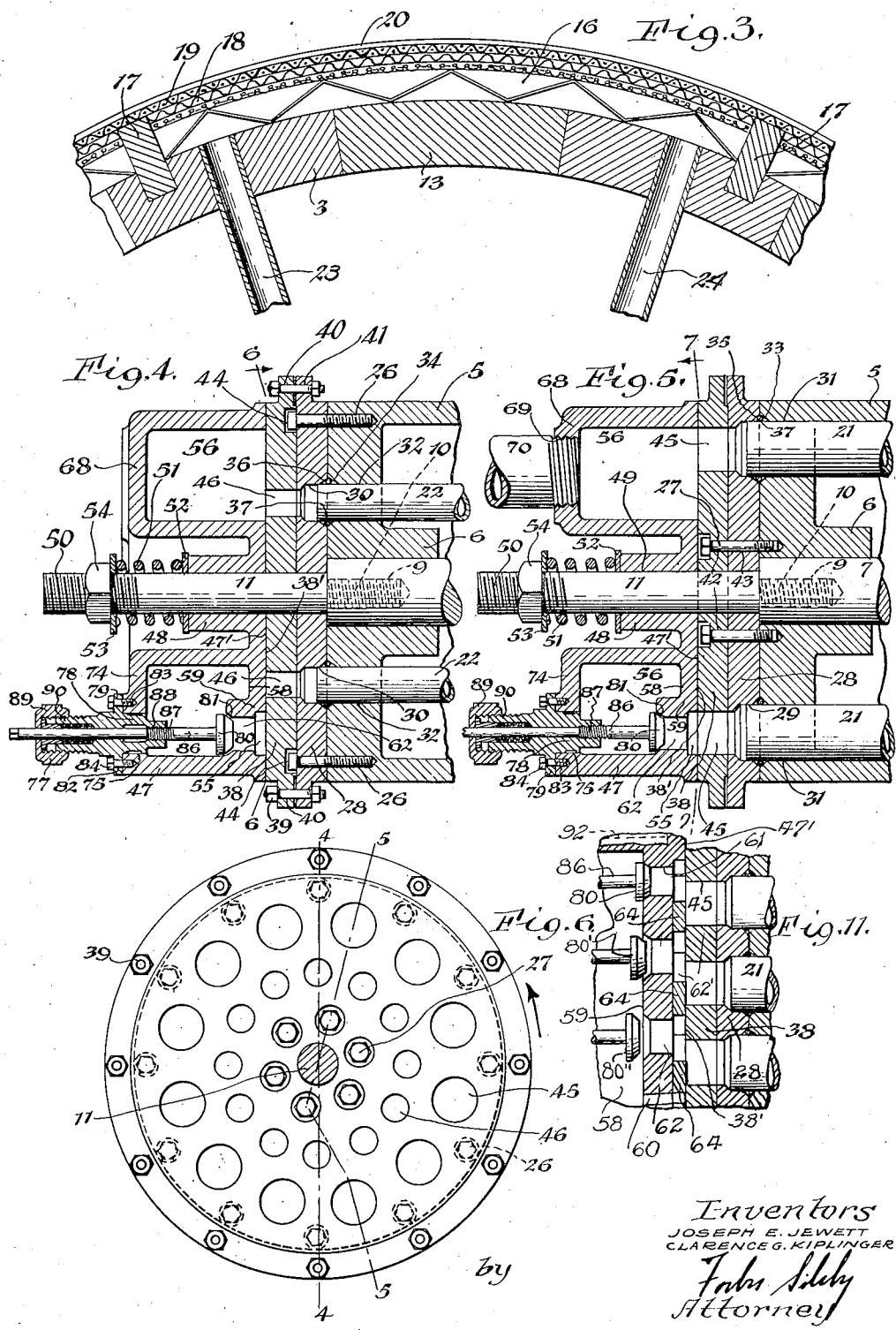

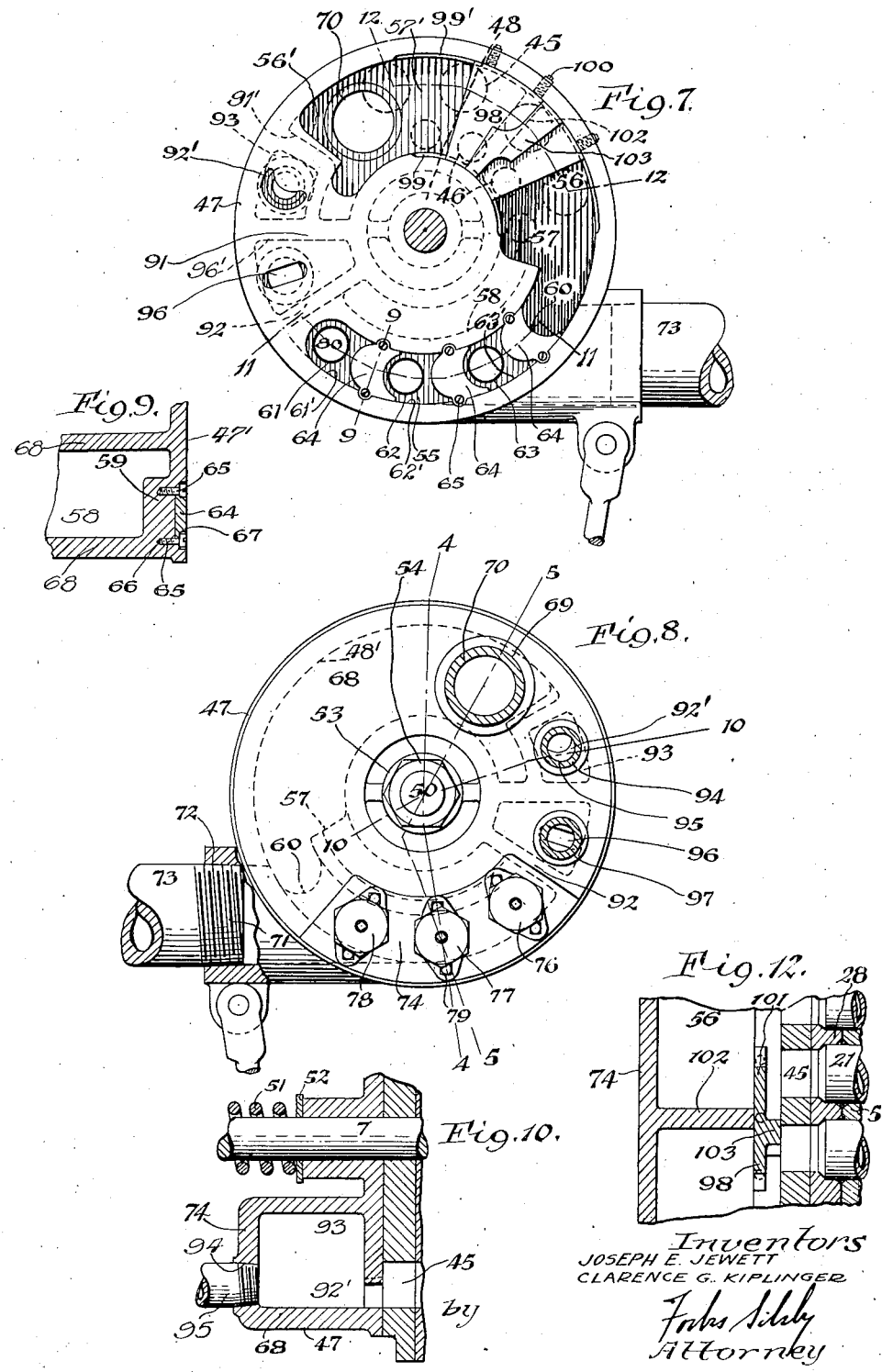

Patented Oct. 2, 1934

1,975,230

UNITED STATES PATENT OFFICE 1,975,230

ROTARY DRUM FILTER

Joseph E. Jewett and Clarence G. Kiplinger, Buffalo, N. Y., assignors to National Aniline and Chemical Company, Inc., New York, N. Y., a corporation of New York Application January 31, 1930, Serial No. 424,909

13 Claims. (Cl. 210—202)

The present invention relates to that class of continuous vacuum filters in which an endless filtering medium suitably supported, is submerged in the material to be filtered, and through which the liquid component of said material is drawn by suction, and from which the clinging filter cake is removed by direct air pressure.

The filter is particularly adapted for the removal of water from aqueous indigo slurries, in which connection we shall hereinafter describe it. However, it is also adapted for separating any other solid or insoluble matter from a liquid, for the purpose of clarifying the liquid or for the recovery of the solid or insoluble matter.

This invention has for one of its objects the provision of a rotary drum filter wherein an initial gentle suction is applied to the filter section as it enters the liquid, and increases in intensity as the filter cake builds up on the periphery of the drum. A further object of the invention is the provision of a filter valve structure whereby a small movement of the valve port accomplishes a large change in effective area of the valve port. Still another object of the invention is the provision of a filter valve structure whereby fluid pressure may be applied to the filter section as a quick blast. Another object of the invention is the provision of a process of suction filtering wherein an initial gentle suction is applied on one side of the filtering medium and increases in intensity as a filter cake is built up on the other side. These and other objects will be apparent from a consideration of the disclosure considered in connection with the accompanying drawings.

In the drawings, Figure 1 is an elevation showing part of the drum and tank broken away; Figure 2 is a section view of the drum taken on the line 2—2 in Figure 1; Figure 3 is a fragmentary view of the drum; Figure 4 is a section view along the line 4—4 of Figures 6 and 8 with the parts assembled; Figure 5 is a section view along the line 5—5 of Figures 6 and 8 with the parts assembled; Figure 6 is a section taken on line 6—6 of Figure 4; Figure 7 is a view along the line 7—7 of Figure 5; Figure 8 is an end view partly in section of the valve with the valve head and gate valves in place; Figure 9 is a fragmentary view of a separator taken on line 9—9 of Figure 7; Figure 10 is a section taken on line 10—10 of Figure 8; Figure 11 is a section taken on line 11—11 of Figure 7 with the parts assembled; Figure 12 is a section taken on line 12—12 of Figure 7 with parts assembled.

Referring to the drawings, Figures 1 and 2, the numeral 1 represents a tank or container of any suitable construction. A false bottom 2 may be provided which conforms the tank generally to the shape of the rotary filter drum 3. The rotary filter drum is partially submerged in the slurry or pulp contained in the tank 1. Axially secured by the bolts 4 to the end of the filter drum is the hollow trunnion 5, thickened at its center and centrally bored at 6, Figures 4 and 5, to receive the end of the shaft 7. A trunnion 5' is similarly secured to the other end of the drum. The drum is supported by the two trunnions 5, 5' which are mounted to rotate in the bearings 8. The shaft 7 is counterbored and tapped at 9, Figures 4 and 5, to receive the reduced and threaded end 10 of the stub shaft 11 which serves a function which will be presently described. Rotation is imparted to the drum through the medium of the driven worm gear 12 mounted on the trunnion 5'.

The filter drum 3 has an impervious periphery or shell 13, Figure 3, constructed in known manner, and is supported by the drum heads 14, 14' and intermediate spider 15. The impervious shell 13 of the drum is externally divided into a number of filter sections 16 of equal area by the cleats 17 which extend longitudinally of the drum. These cleats lie parallel with the axis of the drum in a radial plane and are equidistantly spaced. Each section contains a layer of expanded metal on the shell 13 upon which is placed a section of a cylindrical perforate shell. Upon the shell is placed a wire cloth 18, and a section of burlap 19 is placed on the wire cloth. The construction described provides a support for the filtering cloth 20, which is wrapped around the wire cloth and held in place in any suitable manner.

The drum head 14, Figures 1 and 2, has an opening at its center to provide a passageway for a series of pipes 21 and 22. For each filter section 16 there are a series of branch pipes 24 which communicate with the pipes 21, and which lie in an axial row adjacent the dividing cleat. A second series of branch pipes 23 which communicate with the pipes 22 lie in an axial row on the opposite side of the filter section 16. It is thus apparent that each section 16 has two series of pipes, series 23 and series 24 lying on opposite sides of the section, and communicating with pipes 22 and 21 respectively.

In operation the drum rotates in the direction of the arrow, Figure 1. As a filter section 16 enters the liquor or slurry in the tank, a gentle suction, which gradually increases as a bed of solid particles or filter cake builds up, is applied to the interior of the filter section through the branch pipes 24 and lead-in pipes 21. The intensity of the initial suction applied to the filter section may be varied depending upon the nature of the slurry to be filtered. For filtering a fine slurry where the solid particles have a tendency to pass through the filter cloth, a more gentle suction is required, than in filtering a coarser slurry. The rate at which the intensity of the suction is increased while the filter section is passing through the slurry to be filtered, will depend upon the nature of the slurry and on the permeability of the filter cake which is built up. When the section emerges from the liquor on the opposite side of the tank, and as it is carried around out of the liquor, full vacuum may be applied to the filter section which will suck the excess water out of the filter cake. At or near the top of the drum the filter cake may be sprayed with wash liquor. The wash liquor which is sucked through the filter cake may be conveyed from the apparatus through a separate channel when it is not desired to dilute the filtrate. The arrangement of the pipes 23 and 24 is such that, as the filter section is emerging from the liquor and rising to the top of its path, the pipes 23 are at the lower end of the section and are carrying off most of the liquid. At the top of the path, both series of pipes are carrying off the liquid, and on the downward path pipes 24 carry off most of the liquid, and continue to carry off the liquid after the vacuum in pipes 23 has been cut off. In the course of its travel the vacuum in pipe 24 is cut off and the filter section reaches the scraper 25, at which point the pipes 24, through pipes 21, are connected to a source of fluid pressure which is applied as a quick blast. This blast of fluid dislodges or blows off the filter cake, and the residual cake on the filter cloth is removed by the scraper 25 as the section passes in its course of travel. By continuing the application of vacuum in pipe 23 after the vacuum is cut off from pipe 24, the pipe 24 is given an opportunity to drain before pressure is applied therethrough. The blowing back of liquor is thus prevented.

The construction of the automatic valve whereby the functions above described are accomplished will now be described.

Secured to the outer end of the trunnion 5 by the annular series of bolts 26 and 27, Figures 4, 5 and 6, and rotatable therewith, is the valve pipe plate 28 which has an annular series of holes 29 bored therein to receive the pipes 21 and an annular series of smaller holes 30 bored therein to receive the pipes 22. The trunnion 5 likewise has a series of holes 31 and a series of smaller holes 32 bored to permit passage of the pipes 21 and 22 respectively. The holes 31 and 32 are chamfered at 33 and 34 respectively, and the holes 29 and 30 are correspondingly chamfered at 35 and 36 respectively. The junction of the chamfered edges provides an annular seat for a flexible packing ring 37. By drawing the bolts 26 and 27 tight, the valve pipe plate 28 and the trunnion are drawn together and compress the packing rings 37 to hold the ends of the pipes 21, 22 against displacement.

A valve plate 38 is secured to the valve pipe plate 28 by the outer circular series of bolts 39 which pass through the holes 40 in the valve plate, registering with the holes 41 in the valve pipe plate. The bolts 27 which pass through the counterbored holes 42 in the valve plate, which register with the holes 43 in the valve pipe plate, are threaded into the trunnion 5 and assist in clamping the valve plate to the face of the valve pipe plate. A series of recesses 44 on the inner face of the valve plate 38 are provided to receive the heads of the bolts 26. The valve plate has a series of circular outer port holes 45 and an inner series of port holes 46 bored therein which register with the holes of the series 29 and 30 respectively, when the parts are assembled. The face 38' of the valve plate is accurately machined.

The stationary member or head 47 of the automatic valve, Figures 4, 5, 7 and 8, is thickened at its center to form a hub 48 through which is bored a centrally located hole 49, and through which passes the stub shaft 11 which holds the valve head concentric with the valve pipe plate. The stub shaft 11 extends through the head 47 and is threaded at its end 50. Over the protruding end 50 of the stub shaft 11 is fitted a coil spring 51 which resiliently presses the valve head 47 against the valve plate. One end of the spring 51 is seated in the retaining plate 52 abutting against the hub 48, while the other end is seated against the retaining plate 53. A nut 54 is threaded onto the outer end of the stub shaft 11, and serves to adjust the tension in the spring 51. The head 47 is machined at its face 47' which, when the valve is assembled, bears against the machined face 38' of the valve plate 38.

The valve head 47, Figs. 4, 5 and 7, contains a hollow sector 48' extending from the abutment 92 at one end to the ogee-shaped abutment 91' at the other end. Located in this sector is the vacuum chamber 56, divided by S-shaped wall 102 into sectors 57 and 57'. An annular groove port 55, Figures 4, 5 and 7, of approximately the same width as the diameter of the ports 45, and radially spaced to register with the ports 45, is formed in the face 47' of the valve head 47, and extends circumferentially till it merges with the vacuum chamber 56 at the edge 60. The vacuum chamber 56 extends for the most part from the face 47' of the valve head 47 to form a port of general elongated elliptical form extending circumferentially on the face of the valve head and is undercut at 58, thus providing a web 59, terminating at the edge 57 which separates the groove port 55 from the vacuum chamber 56. A series of valve ports, 61, 62 and 63, shown as being three in number, but which may be of any desired number, are located in the web 59 and join the groove 55 with the undercut portion 58 of the vacuum chamber 56. A series of crescent-shaped separators 64 are interposed between the ports 61 and 62, between ports 62 and 63, and between port 63 and the depressed edge 60 of the web 59, and completely block off the channel 55 at intervals, to form elongated crescent-shaped ports. The distance between the curved edges of a separator is less than the diameter of the ports 45. The separators 64 are retained in place by screws 65, Figure 9, threaded into the tapped bores 66. The heads of the screws and the faces of the separators lie flush with the face 47' of the valve head. The counterbores 67 in the face 47' and the face of the separators 64 provide a depressed seat for the heads of the screws 65.

The walls 68, Figures 5 and 8, of the vacuum chamber extend outward and form a chamber closed at its outer face except for the threaded bore 69, into which fits the vacuum pipe 70, which is connected to a vacuum pump or other source of vacuum. A second connection 71 extends tangentially from the lower edge of the valve head, and is bored through at 72 to receive a vacuum pipe 73, which also is connected to a suitable source of vacuum.

The opposite wall 74 of the vacuum chamber 56 is bored at 75, Figures 4, 5 and 8, in radial alignment with the series of holes 61, 62 and 63 to receive the valve assemblies 76, 77 and 78. Since these valves are identical in construction, only one valve assembly will be described. The assembly comprises a yoke which fits into the hole 75, and a valve retaining plate 79, shown as integral therewith, which holds the assembly in position. The hole 62 in the thickened web 59 is chamfered on its inner edges, as at 81 and provides a seat for the valve head 80. Holes 82 are provided in the retaining plate 79 which register with the threaded bores 83 in the chamber wall 74. The plate is clamped in position by the screws or bolts 84 which pass through the holes 82 and thread into the bores 83.

The valve stem 86 extends through the yoke and packing chamber therein, and is threaded at its lower portion 87. The yoke is similarly threaded at 88, so that, by turning the stem the valve head is seated or unseated in the chamfered seat 81. A hand wheel may be provided for operating the valve. A threaded follower nut 89 fits over the valve stem and is threaded onto the threaded end 90 of the yoke. By advancing or retracting the follower nut, the desired pressure may be applied to the valve packing in the packing chamber to prevent leakage while permitting free turning of the valve stem. The valve assemblies 77 and 78 are identical with that of 76.

An undercut pressure chamber 93 is defined in the hollow sector 48' by the ogee-shaped abutment wall 91' and the abutment wall 91. A crescent shaped port 92' is cut out of the face 47' of the valve and communicates with the undercut pressure chamber 93. The purpose of the crescent shape will be hereinafter described. The pressure port 93 is located the same radial distance from the center as is the series of ports 45 in the valve plate, and is adapted to communicate therewith. A tapped hole 94 passes through the wall 74 into the pressure chamber 93. A pipe 95 is threaded into the wall 94, and at its other end is connected to a suitable source of fluid pressure, whereby the chamber 93 may be placed under pressure.

The walls 91 and 92 define a relief chamber 96' with a relief port 96 of elongated or elliptical shape located in the face 47' of the valve head and communicating with the chamber 96' which communicates with the exterior through the hole 97. The relief port is also the same radial distance from the center as valve ports 45.

For providing against dilution of the mother liquor with the wash liquor, a separator 98 is provided which divides the vacuum chamber into chambers 57 and 57'. The separator comprises a base portion 101 fitting against the web 102 and blocking the channel 56, and a bearing portion 103 at right angles to the base portion and bearing against the face 38' of the valve plate. The bearing portion 103 is shaped so as not to completely stop the suction as the ports 45 and 46 pass across its face. This separator fits into the grooves 99 and 99' in the edge of the chamber 56 and is circumferentially slidable therein. It is held in the desired position by set screws 100 or other suitable means.

The operation of the apparatus will now be described.

The material to be filtered is introduced into the tank 1, and rotation of the filter drum 2 in a clockwise direction (Fig. 1) is imparted through the worm gear 12 and associated parts. As the drum rotates, a filter section 16 reaches the level of liquid in the tank, as indicated by the line A—A in Fig. 1; and the port 45 which communicates with pipe 21, which in turn communicates with branch 24 for that particular section, will reach the elongated crescent shaped valve port 61, and as the port 45 and valve port 61 register, suction is applied to the filter section through pipes 24, pipe 21, port 45, valve port 61, vacuum chamber 56 and vacuum pipe 70 which communicates with a vacuum pump. The point in the revolution of the drum where the suction is applied may be set for different levels of liquid by operating the turnbuckle and guy rods 105 secured at one end to the frame of the apparatus and at the other end to a lug on the stationary valve head, and hold the valve head in fixed position.

At the point at which the filter section 16 is entering the liquid to be filtered, the port 45, connecting with the pipe 24 of this particular section 16 through pipe 21, is being revolved around the face of the valve in a counter-clockwise direction (Fig. 7), and is beginning to pass over port 61. Since this port 61 opens on the passage 61' which has a concave leading edge, the effective area of port 45 will be gradually increased, thereby establishing an initial gentle vacuum in section 16. This vacuum will increase gradually as port 45 continues to revolve and is brought into full registration with port 61. The degree of vacuum will be limited by the setting of the valve 80 with reference to port 61.

During this period, a filter cake begins to build up on the face of the filter section 16 by reason of the vacuum. As section 16 continues in its cycle through the liquid, port 45 is correspondingly revolved past the convex trailing edge of the passage 61' and reaches the concave leading edge of the passage 62' which communicates with port 62. Continued revolution brings port 45 into full registration with port 62. The concave and convex edges of the section 64, dividing passages 61' and 62' serve to effect gradual changes in the effective area of port 45, and because port 45 is of larger diameter than the width of the separators 64, at no time is the port completely closed. The valve 80' controlling the port 62 is opened to a greater extent than the valve 80 and hence greater vacuum is thereby created in the passage 62' and in section 16. Similarly, because of the adjustment of valve 80'', the vacuum in section 16 is again gradually increased on registration of the ports 45 and 63, resulting in the further building up of the cake on the face of filter section 16. Accordingly, the vacuum in section 16 does not increase at such a rate that solid particles are drawn through the filter.

On passing port 63, the port 45 gradually opens into the chamber 57 and the filter section is then subjected to the vacuum prevailing in chamber 57.

During the foregoing portion of the cycle, the port 46, connecting with the pipe 23 of the same section 16, has been closed by the sector of the valve extending over the undercut section 58. On continued rotation of valve plate 28, the port 46 opens to the chamber 57, thus permitting the full vacuum to be applied to section 16 through pipe 23 in addition to pipe 24. Since this movement substantially doubles the exhaust area of the section 16, there will be a further increase in the vacuum applied to the filter face.

The vacuum is fully applied to section 16 until the port 45 has revolved to a point at which it contacts with the separator 103. This element is of such a shape that the area of port 45 will be cut down before that of port 46 is affected. Not until the port 45 opens on the opposite side of separator 103, is the area of 46 changed by the engagement with the inner end of the separator. This design of the separator is desirable in order that a vacuum will be maintained in filter section 16 at all times. Otherwise, if the vacuum were shut off, even momentarily, portions of the filter cake would tend to fall from the surface of the filter section 16 because of the absence of the retentive force, i. e., the vacuum.

During the travel of ports 45 and 46 through the sector 57, the filter section 16 is immersed in the liquid and the filtrate is exhausted through pipe 73. As ports 45 and 46 pass the separator 103, the section 16 emerges from the solution into a position at which wash water is applied. As it is generally not desirable to mix the wash water and the mother liquor, a separate discharge opening 70 is provided in the chamber 57'. During the travel of the ports 45 and 46 over this sector, wash water is applied to the cake and withdrawn by the vacuum applied through the opening 70 and chamber 57'. The cake on the drum passes the washing area just before the leading edge 91' of the valve is reached by port 45. Consequently, ports 45 and 46 are under vacuum for an additional period to remove excess water from the filter cake. Further drying of the cake is effected through the port 46 and pipe 23, after the port 45 is closed by reason of the small curved cut in the valve face adjacent the edge 91'.

The filter section 16 is now approaching the discharge position. As this point is reached, port 46 is closed and port 45 slides over crescent-shaped opening 92' connected to pressure port 93. This causes a blast of fluid, compressed air for example, to be forced into section 16 through pipe 24. The cake is thus practically all removed and any residual cake is readily removed by the scraper 25.

During the remaining portion of the cycle, the port 46 remains closed, but port 45 passes over the elongated opening 96 which is open to the atmosphere, thereby relieving any pressure that may be present in the filter section 16 and connecting pipes 21, 22, 23 and 24. The filter section is then about to re-enter the liquid in the tank and the apparatus is ready for another cycle.

It will be seen that the apparatus is such that a gentle vacuum is first applied to the filtering medium and the vacuum is then gradually built up to a maximum. The relative movement of the ports 45 and the crescent-shaped passages 61', 62' and 63' together with the controlled adjustment of the valves 80, 80' and 80'' in the ports 61, 62 and 63, respectively, insure a gradual building up of the vacuum in the filter sections.

It will be understood that the rate of increase of the vacuum can also be controlled by varying the speed of rotation of the drum which will cause the ports 45 to move faster or slower. If they move faster, the vacuum will be increased rapidly. If they move slowly, a slower increase will result.

The number of valve ports 61, 62 and 63 used may vary according to the operation desired. It may be desirable at times to close some or all and by proper adjustment, varying degrees of vacuum and rate of increase of the vacuum may be obtained. For a fixed set of operating conditions the valves 76, 77 and 78 may be dispensed with, in which case the ports 61, 62 and 63 should be cut to the correct sizes to secure the desired initial vacuum and vacuum gradient.

It may be preferable to draw off the wash liquor with the mother liquor in which case the separator 98 may be removed. Since this separator is circumferentially slidable, it is possible to adjust it so as to draw off selected portions of the wash water, together with the mother liquor. Otherwise, the two are exhausted separately.

Having described our invention, what we claim as new and desire to secure by Letters Patent is:—

1. An apparatus of the character described comprising a rotatable filter drum having its periphery divided into independent filter sections, a valve plate axially mounted to rotate with the filter drum, said valve plate having a circumferential series of pipe ports therein, pipes joining certain of said pipe ports with corresponding filter sections, a hollow valve head mounted in juxtaposition to the valve plate, means for pressing the valve head against the valve plate, said valve head having crescent-shaped valve ports in one face thereof adapted to register with a plurality of the pipe ports, said valve ports communicating with a vacuum chamber, and means for varying the effective area of said valve ports, said last named means and said valve ports cooperating to produce a gradual vacuum gradient.

2. In an apparatus of the character described, the combination comprising a rotatable filter drum divided into independent filter sections at its periphery, a valve plate axially mounted to rotate with said drum, said valve plate having a plurality of concentric series of ports arranged therein, a valve head adapted to bear against said valve plate and having therein ports arranged to register at different positions in the rotation of the drum with ports of only one series in the valve plate and with ports of more than one series in the valve plate.

3. A filter of the class described comprising a tank, a drum mounted to rotate therein and provided on its periphery with an annular series of filter sections, hollow trunnions for rotatably supporting the drum, two series of pipes leading into one trunnion and communicating with the filter sections, a disc secured upon the end of a hollow trunnion in which the ends of said pipes are secured, a non-rotary hollow valve head fitted to the face of said disc, said valve head having in its face a concentrically curved groove-port of a length to register simultaneously with a plurality but less than the whole number of ports in the first disc, removable spacers for dividing said groove-port into variable independent valve ports, means for applying a vacuum to said valve head and means for varying the effective area of said valve ports.

4. An apparatus of the character described comprising a rotatable filtering medium divided into independent filtering sections, hollow trunnions rotatably supporting the drum, one trunnion being closed at its outer end, and having a circumferential series of holes therein chamfered at their outer edges, a valve plate concentrically secured to the outer end of said trunnion and having a circumferential series of holes therein chamfered at their inner edges and registering with the holes in the trunnion to form a packing chamber, pipes passing through the aligned holes and communicating with the filter sections, and means to clamp the valve plate to the trunnion to compress the packing in the packing chamber and hold the pipes against displacement.

5. An automatic rotary vacuum filter valve comprising a relatively rotatable pipe plate having a concentric series of circular pipe ports in the face thereof, a hollow valve head adapted to have its plane face resiliently pressed against the pipe plate and be held concentrically therewith, abutment walls separating the valve head into vacuum, pressure and relief chambers, a circumferentially extending groove-port formed in the plane face of the valve head communicating at one end with the vacuum chamber and adapted to register with the pipe ports, a series of crescent-shaped separators dividing the groove-port into independent elongated crescent-shaped sections, independent passages joining the vacuum chamber with the independent sections, and a crescent-shaped passage passing through the plane face of the valve head to the pressure chamber.

6. An automatic rotary vacuum filter valve comprising a rotatable pipe plate having a concentric series of pipe ports therein, a fixed hollow valve head adapted to have its plane face resiliently pressed against the pipe plate and be held concentrically therewith, abutment walls separating the valve head into vacuum, pressure and relief chambers, a circumferential groove-port formed in the plane face of the valve head communicating at one end with the vacuum chamber and adapted to register with the pipe ports, a series of separators dividing the groove-port into independent sections, independent passages joining the vacuum chamber with the independent sections, and independent passageways passing through the plane face of the valve head in the pressure and relief chambers respectively.

7. An automatic rotary vacuum filter valve comprising a rotatable valve plate having a concentric series of pipe ports therein, a fixed hollow valve head adapted to have its plane face resiliently pressed against the pipe plate and be held concentrically therewith, abutment walls separating the valve head into vacuum, pressure and relief chambers, a series of passages formed in the plane face of the valve head connecting respectively with the vacuum, pressure and relief chambers, said passages being in a circumferential series adapted to register with the pipe ports, means for varying the size of the passages which communicate with the vacuum chamber and means for circumferentially varying the point in the path of rotation of the pipe plate at which a particular passage communicates with a particular pipe port.

8. An automatic rotary vacuum filter valve comprising a relatively rotatable pipe plate having a concentric series of circular pipe ports passing therethrough, a valve head having a vacuum chamber therein adapted to have its plane face resiliently pressed against the pipe plate and be held concentrically therewith, a series of circumferentially extending elongated crescent-shaped ports formed in the plane face of the valve head independently communicating with the vacuum chamber and adapted to register with the pipe ports, a circumferentially extending elongated port formed in the plane face of the valve head communicating with the vacuum chamber and adapted to register with the pipe ports, and a crescent-shaped pressure port formed in the plane face of the valve head adapted to register with the pipe ports.

9. An automatic rotary vacuum filter valve comprising a rotatable valve plate having a concentric series of pipe ports therein, a valve head adapted to have its plane face resiliently pressed against the pipe plate and be held concentrically therewith, a series of independent groove-ports formed in the plane face of the valve head, said groove ports being in a circumferential series spaced at distances less than the circumferential width of the pipe ports and adapted to register with the pipe ports, means for applying a vacuum to said groove ports, means for changing the effective area of the groove ports to regulate the rate of fluid flow therethrough, a circumferentially extending elongated groove-port spaced from the end independent groove-port at a distance less than the circumferential width of the pipe ports, and means for applying a vacuum to said elongated groove port.

10. In an apparatus of the character described, the combination comprising a rotatable filter drum divided into independent filter sections at its periphery, a valve plate axially mounted to rotate with said drum, said valve plate having a plurality of concentric series of ports arranged therein, a valve head adapted to bear against said valve plate and having therein ports arranged to register at one position in the rotation of the drum with ports of only one series in the valve plate, at another position in the rotation of the drum with ports of only a second series in the valve plate, and at another position in the rotation of the drum with ports of a plurality of series in the valve plate, valves for regulating the effective area of the valve ports, said valves and said ports cooperating to produce a gradual vacuum gradient, means for applying a constant vacuum on one side of said ports, and pipes connecting the filter sections with the ports in the valve plate.

11. In an apparatus of the character described, the combination comprising a rotatable filter drum divided into independent filter sections at its periphery, a valve plate axially mounted to rotate with said drum, said valve plate having an outer and an inner series of ports arranged concentrically therein, a valve head adapted to bear against said valve plate and having therein crescent shaped ports arranged to register at different positions in the rotation of the drum with ports of only the outer series in the valve plate, with ports of only the inner series in the valve plate, and with ports of both series in the valve plate.

12. In an apparatus of the character described, the combination comprising a rotatable filter drum divided into independent filter sections at its periphery and means for applying pressure and vacuum to each of said filter sections, said means including a plurality of pipes and a valve which in operation selectively connects one of said pipes with the vacuum applying means or the pressure applying means and connects another of said pipes with the vacuum applying means but at no time with the pressure applying means.

13. An automatic rotary vacuum filter valve comprising a rotatable valve plate having a concentric series of pipe ports therein, a fixed hollow valve head adapted to have its plane face resiliently pressed against the pipe plate and be held concentrically therewith, abutment walls separating the valve head into vacuum, pressure and relief chambers, and a series of passages formed in the plane face of the valve head respectively connecting the vacuum, pressure and relief chambers with a vacuum applying means, a pressure applying means, and the atmosphere, said passages being in a circumferential series adapted to register with the pipe ports.

JOSEPH E. JEWETT.
CLARENCE G. KIPLINGER.